Feb. 16, 1926.
J. POTTER
1,573,121
SNOW REMOVING APPARATUS
Filed Feb. 2, 1925
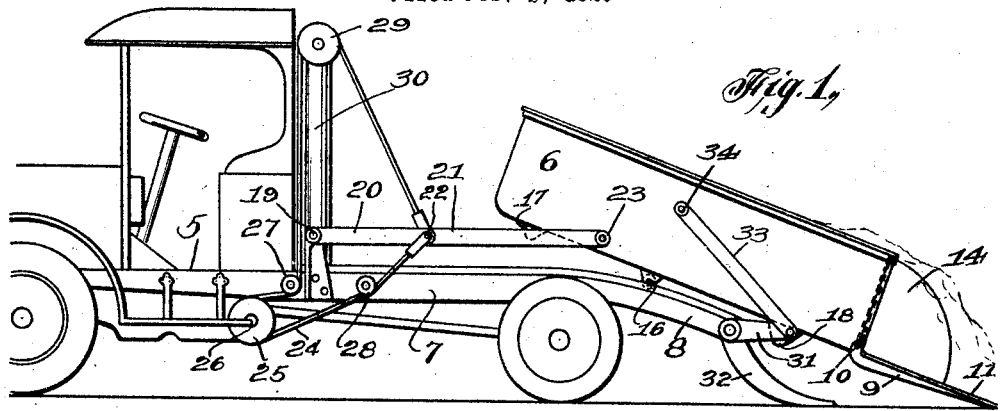
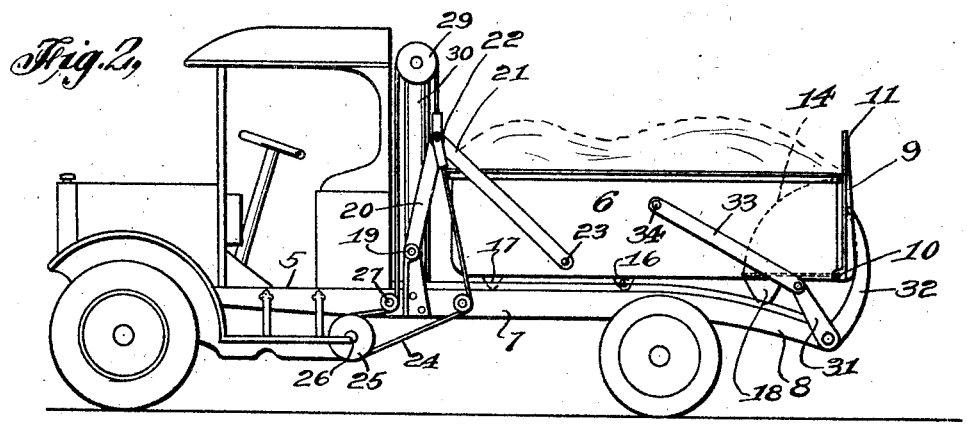
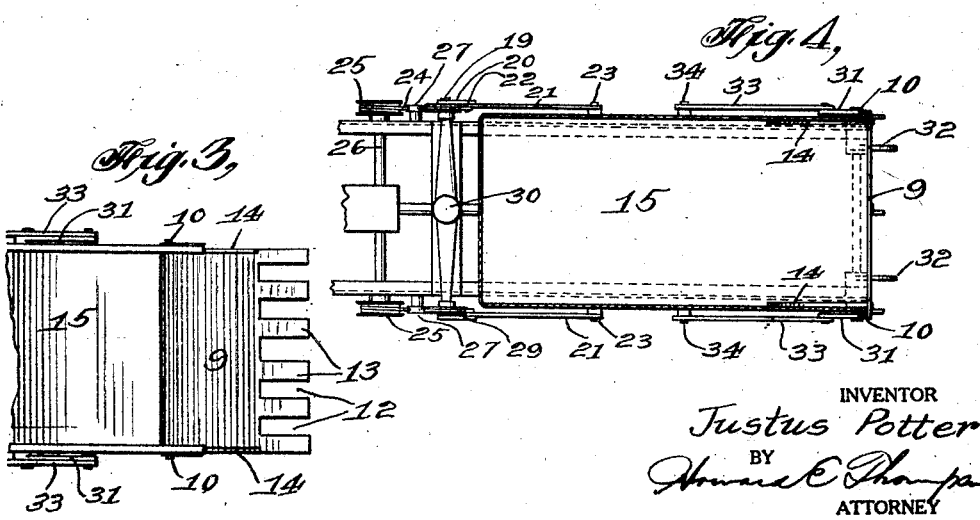
INVENTOR
Justus Potter
BY
Howard E. Thompson
ATTORNEY Patented Feb. 16, 1926.

1,573,121

UNITED STATES PATENT OFFICE.

JUSTUS POTTER, OF RICHMOND HILL, NEW YORK, ASSIGNOR OF ONE-HALF TO WILLIAM T. STEVENSON, OF WOODSIDE, LONG ISLAND, NEW YORK.

SNOW-REMOVING APPARATUS.

Application filed February 2, 1925. Serial No. 6,230.

*To all whom it may concern:*

Be it known that I, JUSTUS POTTER, a citizen of the United States, and residing at Richmond Hill, in the county of Queens and State of New York, have invented certain new and useful Improvements in Snow-Removing Apparatus, of which the following is a specification, such as will enable those skilled in the art to which it appertains to make and use the same.

This invention relates to apparatus for use in the removal of snow from one place to another or for the removal of any other material or substance; and the object of the invention is to provide an apparatus of the class specified, the body portion of which is movably disposed on the chassis of a motor vehicle to permit of its use as a scoop as well as a storage body; a further object being to provide means involving levers for moving said body into its several positions and for rigidly supporting and reinforcing the body when used as a scoop; a further object being to provide the outer end portion of the body with a movable end wall adapted to be dropped into position to function as a scoop blade or end, means being provided for automatically moving said end wall into a closed position and for retaining the same in such position; and with these and other objects in view, the invention consists in an apparatus of the class and for the purpose specified which is simple in construction and operation, and efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a motor vehicle illustrating my improved apparatus mounted in connection therewith and indicating the method of its use.

Fig. 2 is a view similar to Fig. 1 with the parts in a different position.

Fig. 3 is a plan view of a part of the construction shown in Fig. 1; and,

Fig. 4 is a plan view of a part of the construction shown in Fig. 2.

In the drawing I have shown for the purpose of illustrating one use of my invention, a motor vehicle 5 such as are commonly known as dump trucks and the like, and the body 6 thereof is mounted to move relatively to the chassis or frame 7 of the vehicle, and said frame is preferably curved outwardly and downwardly at the rear end portion thereof as shown at 8.

The body 6 may be of special construction or of conventional form and construction, and comprises a bottom, side and one end wall, the other end of the body being open and adapted to be closed by a movable end scoop member 9 pivoted to the body 6 as shown at 10, and which when in a closed position projects beyond the top of the body as shown at 11, said projecting portion being divided by recesses 12 to form a plurality of prong-like members 13. The member 9 is also preferably provided with side walls 14 which are adapted to set within the adjacent side walls of the body when the member 9 is in closed position and which also function to guide material into the storage chamber or compartment 15 of the body.

As previously stated, the body 6 is movably disposed on the frame 7, the bottom of said body being provided substantially centrally thereof with rollers 16 and at the end portions thereof with skids 17 and 18 to support the body in substantially horizontal position when moved entirely upon the frame 7 as shown in Fig. 2 of the drawing. It will be understood however that any means or method of mounting the body 6 upon the frame and guiding the same in its movement thereon, may be employed.

Pivoted to the sides of the frame 7 as shown at 19 are levers 20 with the free ends of which are pivoted other levers 21, as shown at 22, the levers 21 being also pivotally mounted in connection with the side walls of the body 6 as shown at 23. I also provide means connected with the coupling of the separate levers 20 and 21 as at 22 for operating said levers to move the body 6 into different positions, and in the construction shown said means comprises chains, cables or the like 24 driven from pulleys or sprockets 25 on a shaft 26 rotated by the motor of the vehicle in any desired manner. The chains or cables 24 pass around two guide members 27 and 28 on each side of the frame and around similar guide members 29 supported in connection with the upper end or crosshead of a standard or column 30 mounted upon the frame 7 rearwardly of the driver's seat of the vehicle and forwardly of the body 6.

From the foregoing, it will be apparent that propelling the chains or cables 24 in one direction, the levers 20 and 21 may be actuated to move the body 6 from the position shown in Fig 2 into the position shown in Fig. 1, in which last named position said levers come in common alinement and serve to lock and rigidly support the body in its extended and inclined position for the purpose hereinafter set out. The movement of the chains or cables 24 in the opposite direction will serve to return the levers 20 and 21 into the position shown in Fig. 2 and to pull the body 6 upwardly onto the chassis or frame 7 as will be apparent.

I also pivotally mount in connection with the rear end portion 8 of the frame and at the opposite sides thereof, levers 31 having hook-shaped arms 32 disposed at an angle thereto and adapted to cooperate with the movable back wall 9 of the body 6 as clearly seen in Fig 2 of the drawing, and pivoted to the levers 31 are other levers 33 which are pivoted to the side walls of the body 6 as shown at 34. The last named lever construction cooperates to support the body 6 in its different position and also provide for the automatic closing and opening of the back wall 9, it being understood that as the body 6 is moved from the position shown in Fig. 1 to the position shown in Fig. 2 the hook-shaped members 32 come beneath the wall 9 and serve to raise said wall and the material thereof and to move the same into a closed position and to displace the material thereon in the chamber or compartment 15 of the body 6.

It will be apparent from the foregoing description that the body 6 constitutes an extension of or a part of the scoop member 9 and in the use of an apparatus constructed in accordance with my invention and particularly in its use in the removal of snow, which is previously arranged in piles on a street or roadway, the body 6 is first dropped into the position shown in Fig. 1 with the member 9 extended and moving over the surface of the street or roadway or at a predetermined distance therefrom, and the vehicle is then backed into the snow pile and the member 9 and body 6 functioning as a scoop or shovel digs into the pile and forces the snow upwardly into the chamber 15 of the body 6. As the vehicle continues to progress into the pile of snow, the mechanism for actuating the levers 20 and 21 is put into operation to release the lock of said levers, and as the vehicle progresses further, the resistance of the pile of snow will operate to aid the movement of the body 6 into the frame 7 and to properly pile the snow in the chamber or compartment 15, and in the aforesaid operation, the scoop member or rear wall 9 of the body is automatically raised and the snow contained within the member 9 is admitted into the chamber 15, and in this way a substantially full load of snow is collected in and confined in the chamber 15 of the body 6, and the vehicle may now progress to a point where the snow is to be dumped for disposal. It will also be understood that the vehicle with the body 6 and member 9 in the position shown in Fig. 1 or a position substantially similar thereto may progress over a street or roadway and plow up snow thereon and automatically pass the same into the compartment 15 of the body 6 in the manner of a large shovel or scoop, avoiding the necessity of piling the snow on the street or roadway.

My improved apparatus, as will be apparent, avoids the long delays now experienced in the removal of snow by requiring numerous workmen shoveling snow into the body of a motor vehicle, and one of the distinctive features of my invention resides in the utilizing of the vehicle body as a part of the scoop or shovel to provide for a quick loading of snow in the chamber 15 of the body, which operation effects a great saving of time and labor and a consequent saving of expense in the removal of snow, especially in an apparatus of comparatively simple construction and operation. It will also be understood that I am not necessarily limited to the use of my improved apparatus in the removal of snow or in other words in the loading of snow on the body 6, as said apparatus may be used in loading dirt, sand, gravel, cracked rock and other similar material, it being understood that the vehicle as well as the body and scoop member 9 and the means for operating the several parts, will be constructed of sufficient strength and durability to accomplish the desired results, and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. An apparatus of the class described comprising a motor vehicle, a body movably disposed on said vehicle and adapted to be normally supported in horizontal position upon the frame work of the vehicle and to be moved into an inclined position, the rear end portion of said body being provided with a movable end wall adapted to function as a scoop whereby predetermined material may be passed into the chamber of said body in the backward movement of said vehicle, means for moving said body into its several positions, and means for moving said end wall into a raised and closed position in the operation of returning the body from an inclined position to a horizontal position.

2. An apparatus of the class described comprising a motor vehicle, a body movably disposed on said vehicle and adapted to be normally supported in horizontal position upon the framework of the vehicle and to be moved into an inclined position, the rear end portion of said body being provided with a movable end wall adapted to function as a scoop whereby predetermined material may be passed into the chamber of said body in the backward movement of said vehicle, means for moving said body into its several positions, and means for moving said end wall into a raised and closed position in the operation of returning the body from an inclined position to a horizontal position, said first named means involving levers for rigidly retaining said body in its inclined position.

3. An apparatus of the class described comprising a motor vehicle, a body movably disposed on said vehicle and adapted to be normally supported in horizontal position upon the framework of the vehicle and to be moved into an inclined position, the rear end portion of said body being provided with a movable end wall adapted to function as a scoop whereby predetermined material may be passed into the chamber of said body in the backward movement of said vehicle, means for moving said body into its several positions, means for moving said end wall into a raised and closed position in the operation of returning the body from an inclined position to a horizontal position, said first named means involving levers for rigidly retaining said body in its inclined position, and said body operating means being in operative connection with the motor of the vehicle.

4. An apparatus of the class described comprising a motor vehicle, a body movably disposed on said vehicle and adapted to be normally supported in horizontal position upon the framework of the vehicle and to be moved into an inclined position, the rear end portion of said body being provided with a movable end wall adapted to function as a scoop whereby predetermined material may be passed into the chamber of said body in the backward movement of said vehicle, means for moving said body into its several positions, means for moving said end wall into a raised and closed position in the operation of returning the body from an inclined position to a horizontal position, said first named means involving levers for rigidly retaining said body in its inclined position, said body operating means being in operative connection with the motor of the vehicle, and the free edge of the end wall of said body being provided with a plurality of prongs.

5. An apparatus of the class described comprising a motor vehicle having a rearwardly directed chassis, a body movably disposed longitudinally of the chassis, means involving levers for actuating said body, said body being adapted to be moved backwardly into an inclined position, a scoop end wall pivotally mounted in connection with the rear end of the body and adapted when extended to form a scoop for directing predetermined material into the body in the backward progress of the motor vehicle over a roadway, and means for moving said scoop end wall into closed position in the operation of moving the body upon the chassis into horizontal position.

6. An apparatus of the class described comprising a motor vehicle having a rearwardly directed chassis, a body movably disposed longitudinally of the chassis, means involving levers for actuating said body, said body being adapted to be moved backwardly into an inclined position, a scoop end wall pivotally mounted in connection with the rear end of the body and adapted when extended to form a scoop for directing predetermined material into the body in the backward progress of the motor vehicle over a roadway, means for moving said scoop end wall into closed position in the operation of moving the body upon the chassis into horizontal position, and the levers for actuating said body being adapted to reinforce the same when in inclined position.

7. An apparatus of the class described comprising a motor vehicle, a body movably disposed on the frame of said vehicle and constituting the body proper of the vehicle, means for securing said body in scooping position, and means actuated by the motor of said vehicle for moving said body into its several positions.

8. An apparatus of the class described comprising a motor vehicle, a body movably disposed on the frame of the vehicle and constituting the body proper of the vehicle, means actuated by the motor of the vehicle for moving said body into its several positions, and means involving said first named means for automatically retaining said body in scooping position.

9. An apparatus of the class described comprising a motor vehicle, a body movably disposed on the frame of the vehicle and constituting the body proper of the vehicle, means actuated by the motor of the vehicle for moving said body into its several positions, means involving said first named means for automatically retaining said body in scooping position, and the rear end portion of said body being provided with a movable end wall forming, when in extended position, a scoop extension for said body permitting the passage of material into the chamber of the body in the backward driven movement of the vehicle.

10. An apparatus of the class described comprising a motor vehicle having a rearwardly directed chassis, a body movably disposed longitudinally of the chassis and constituting the body proper of the vehicle, means involving levers and the motor of the vehicle for actuating said body, said body being moved backwardly into inclined and scooping position and retained in such position by said means, and a scoop end wall pivotally mounted in connection with the rear end of the body and adapted when in extended position to form a scoop extension for directing predetermined material into the body in the backward progress of the motor vehicle over a roadway.

In testimony that I claim the foregoing as my invention I have signed my name this 29th day of Jan. 1925.

JUSTUS POTTER.